Patented Feb. 10, 1948

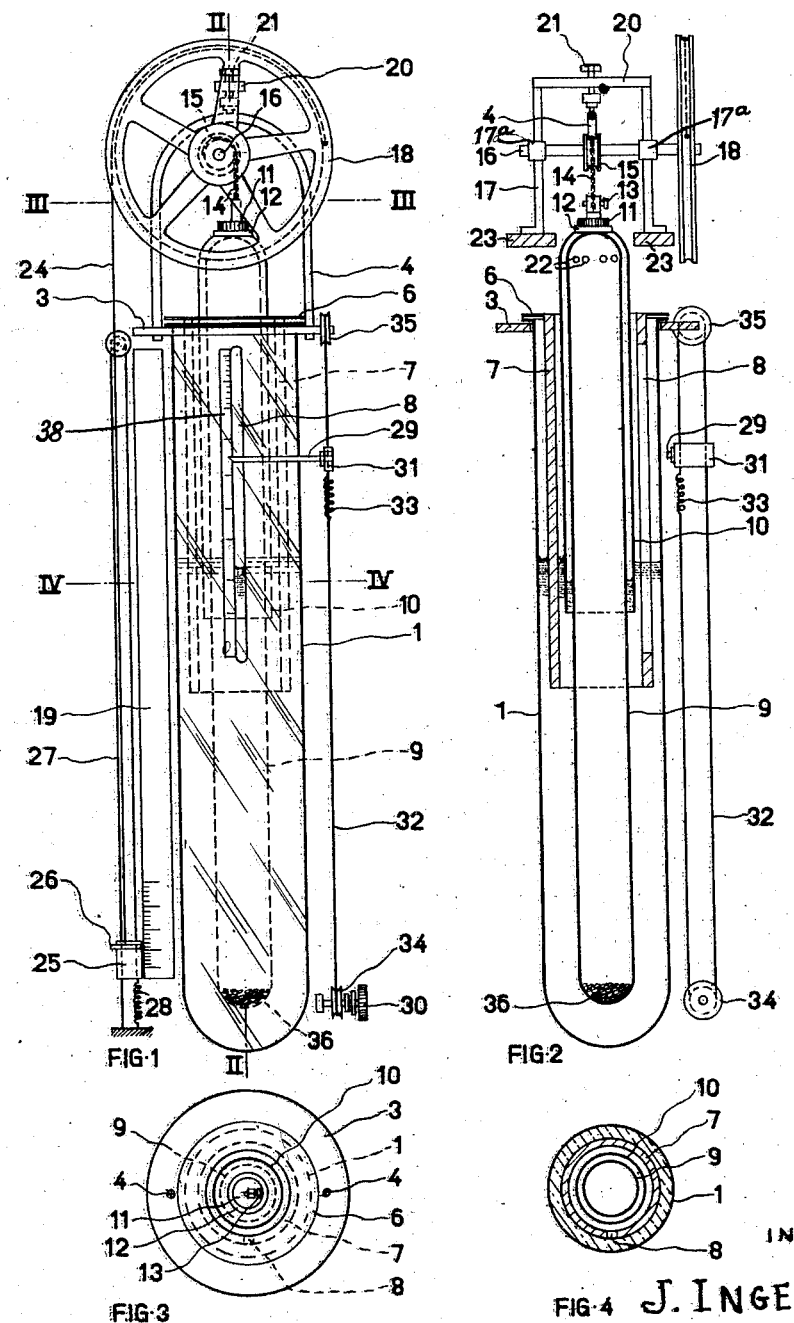

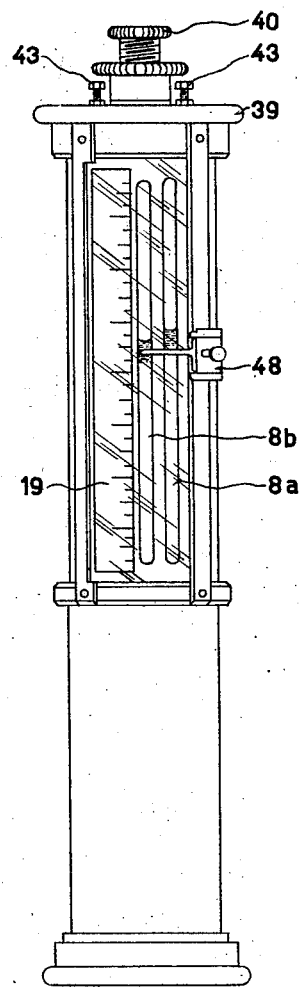
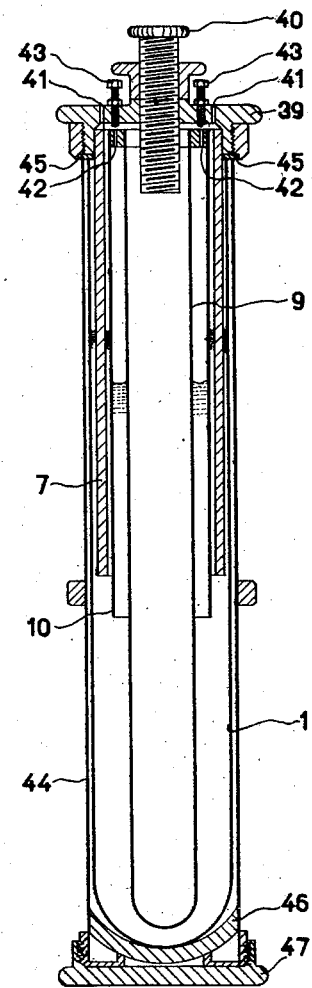
FIG·6    FIG·5

2,435,785

UNITED STATES PATENT OFFICE 2,435,785

WEATHER-FORECAST APPARATUS

Johannes Ingenhof, Haarlem, Netherlands

Application April 26, 1938, Serial No. 204,453
In the Netherlands April 26, 1937

Section 3. Public Law 690. August 8, 1946
Patent expires April 26, 1957

4 Claims. (Cl. 73—4)

For forecasting the weather a barometer is generally used. A barometer, however, indicates the atmospheric pressure, but atmospheric pressure is not an accurate guide to the state of the weather that is to be expected. As often occurs, for the same barometric reading the weather may be either good or bad. Furthermore, the barometer may only indicate a low pressure when the state of the weather is already bad, which is much too late.

The apparatus according to the present invention consists of an air-filled cylinder, sealed at its lower end and communicating at its upper end with a bell surrounding the cylinder along a part of its length. The cylinder and bell are arranged within a glass tube which contains a non-volatile and non-congealing liquid and which is open at its upper end, while a cylinder having a vertical slot therein is disposed between the bell and tube and extends down to the lower end of the bell. Between the bell and the slotted cylinder on one side and between the glass tube and the slotted cylinder on the other side, capillary spaces are provided, arranged in such a way that the rise or fall of the level of the liquid between the outer glass tube and the slotted cylinder and the rise or fall of the level in the slot of the cylinder can be read. When, for example, the air temperature rises, the air in the inner cylinder expands. The liquid in the slot rises together with the level in the capillary space which is standing higher. In other words, when the weather conditions are favorable or stable, the air will show little change in pressure, temperature, dampness and density, and the level of the liquid in the capillary space will be higher than the level of the liquid in the wider space, which is not capillary, and the difference between both levels will be a maximum. When the temperature is rising quickly, indicating a change in the state of the weather, the liquid in the slot rises more rapidly than in the capillary space. Consequently the difference between the level of the liquid in the groove and in the capillary space decreases, indicating thereby that the weather will be unfavorable. At a quick rise of temperature, which normally precedes an unfavorable change in the weather, the air within the cylinder will work on the liquid between the cylinder and bell and the displacement thereof in the wider space will be effected more easily because in that space there is less resistance. The liquid in this space and in the narrow space between the tube and the outer cylinder and between the outer cylinder and the bell is displaced. However, in the wider space the displacement (rising) is quicker than in the capillary spaces and the difference of the levels will decrease, thus indicating an unfavorable change of the weather. Observations over a long period of time have verified this. This comparison of the levels of the liquids is read directly. The apparatus of the present invention gives the indications derived from the levels of the liquid much earlier than the usual barometer, because the latter responds to atmospheric pressure while in the apparatus of the present invention the preponderating influence is the fluctuation in temperature. Furthermore, the present apparatus indicates a high level of the liquid when the weather is warm, damp and/or windy and a low level when the weather is cold, dry or calm. Warm weather conditions and changes therein always produce high "levels," whereas cold weather conditions and the changes therein are indicated by low "levels." The change in the type of weather and the direction in which this change is occurring are thus shown in special parts of the instrument.

The invention will be described more fully with reference to the accompanying drawings wherein:

Figure 1 is a front view.

Fig. 2 is a vertical section on the line II—II of Fig. 1.

Fig. 3 is a horizontal section on the line III—III of Fig. 1.

Fig. 4 is a horizontal section on the line IV—IV of Fig. 1 of the apparatus.

Fig. 5 is a vertical section of another embodiment.

Fig. 6 is a front view of said other embodiment of the apparatus.

As shown in Figs. 1–4, the apparatus consists of a glass tube 1, closed at its lower end and having a flange at its upper end by means of which the tube is supported on a metal ring 3. The ring 3 is suspended from a fixed part 20 of the frame 17 by means of an inverted U-shaped member 4 and an adjusting screw 21.

The flange of the glass tube 1 supports a cylinder 7 which extends about half way down within the tube and forms a capillary space between the tube 1 and the cylinder 7 and between the cylinder 7 and a bell 10. The cylinder 7 is provided with a longitudinally extending slot 8 and a scale 38. Inside the cylinder 7 there is freely hung a bell 10 open at its lower end and closed at its upper end as is also that of cylinder 9 by means of a screw 11 and a leather gasket disc 12. The upper end of the cylinder 9 communicates with the bell 10 by means of small apertures 22. As already stated, the bell 10 extends within the cylinder 7 but not to the bottom thereof. The cylinder 9 extends nearly to the bottom of the glass tube 1. The bell 10 and the cylinder 9 are suspended from a pulley 15 by means of a pin 13 and a chain 14. The chain 14 passes around the pulley 15 and is rigidly secured thereto. The pulley 15 is secured on a shaft 16 on which is mounted a larger pulley 18. The shaft 16 is supported by means of bearings 17a in a frame 17 mounted on supports 23 as shown in Fig. 2. A cord 24 is secured to the pulley 18 by means of an eye. A pointer holder 25 with pointer 26 is supported on the cord 24. The pointer 26 moves along a scale 19. The pointer holder 25 is guided by means of a span wire 27, which is fastened at one end directly, and at the other end through a tension spring 28 to a fixed point.

A button 30 is arranged on a shaft of a pulley 34, around which passes a wire 32. The wire 32 passes over a pulley 35 and between the ends of this wire 32 a pointer holder 31 with pointer 29 together with a tension spring 33 is arranged in such a manner that by rotating the button 30 the pointer 29 may be adjusted visibly along the slot 8 until it conforms with the level of the liquid meniscus. Alteration of the height of the meniscus, owing to the temperature or pressure of the atmosphere may be later ascertained by comparing the new height on the scale 38 with the previous level indicated by the pointer 29.

The tube 1 is adapted to be adjusted higher or lower by the screw 21 and by means of the U-shaped member secured to the tube 1, the cylinder 7 suspended on the metal ring 3 of the tube 1 being moved therewith. The adjustment of the tube 1 together with the cylinder 7 while the cylinder 9 and bell 10 remain stationary results in an alteration of the level in the slot 8 which is visible on the scale 38 and also an alteration of the position of the cylinder 9 and the bell 10 in such a manner that the position of height of the cylinder 9 and the bell 10 and also the position of the pointer 26 with regard to the scale 19 may be corrected.

The open glass tube 1 is so far filled with a liquid which is non-volatile and non-congealable at low temperatures that the lower part of the cylinder 7, which is open at its lower end, and the bell 10 extend into the liquid a substantial amount. The cylinder 9 and the bell 10 are filled with a certain quantity of air whereafter they are locked by means of the screw 11 and the disc 12. Atmospheric air freely enters the glass tube 1, the cylinder 7 and between the cylinder 7 and the bell 10. The bell 10 is so arranged that the volume of air in the cylinder 9 and the bell 10 is enclosed by means of the liquid between the cylinder 9 and the bell 10. The annular spaces between the cylinder 7 and the glass tube 1 and between the cylinder 7 and the bell 10 are capillary spaces. The cylinder 9 and the bell 10 depending into the liquid may be adjusted in the desired position by loading cylinder 9 with a suitable material 36. The said adjustment occurs in the middle of the scale in conformity with a normal condition of the atmosphere. The level of liquid between the glass tube 1 and the cylinder 7 and between the cylinder 7 and the bell 10 and between the cylinder 9 and the bell 10 will then be equal.

When the temperature or the pressure of the atmosphere changes as when the temperature is rising, the air volume in the cylinder 9 and the bell 10 will be altered, in consequence of which the level of liquid in the cylinder 7, in the slot 8 and in the glass tube 1 also alter. In accordance therewith, the position of the floating members 9 and 10 will be altered, said alteration being indicated by means of the pointer of the scale 19. The figures on the said scale are divided from the upper to the lower end, for example, from 0-160, whereas the level of liquid may be read at the same time in the capillary space between the glass tube 1 and the cylinder 7 and in the slot 8 of the cylinder 7 on the scale 38, on which scale the figures are going from the lower to the upper end, say from 0-60, so that the sum of the readings on both scales (19 and 38) will be a higher or lower figure than previously according to whether the liquid level has risen or fallen.

Every alteration in the conditions of the atmosphere, and thus in the state of the weather, will be indicated by the said sum of the readings and thus be a single number.

In Figs. 5 and 6 is shown an apparatus in which the glass tube 1 may be rigidly mounted so that the present apparatus may be used on board ships. The cylinder 9 forms then one unitary structure with the bell 10, the cylinder 7 and the screw cover 39 on which the casing cylinder 44 has been screwed, which latter is provided with oblong sight holes 8b and 8a, of which 8b is in alignment with the slot 8 in the cylinder 7. With the intervention of a leather ring 45 and a disc 46 the glass tube 1 is tightly pressed by means of a screw bottom 47 against the cover 39. Atmospheric air may be admitted by means of holes 41 to the glass tube 1 and the cylinder 7. The cylinder 9 and the bell 10 being filled with air are in communication with each other by means of holes 42. When turning down the stop screws more or less in the holes 41 (the screws are not shown in the drawings), the holes 41 will be sealed while at the same time the communication between the cylinder 9 and the bell 10 may be closed by means of the screws 43 in order to prevent during transport of the apparatus any liquid from spilling into the cylinder 9. A screw 40 depending in the cylinder 9 is provided in order to alter the air volume for adjusting the level of liquid by moving the said screw a greater or lesser degree downwards by which the liquid meniscus in the slot 8 comes to about the middle of the scale.

Finally, the height of the level of liquid in the slot 8 or the position in the capillary spaces between the glass tube 1 and the cylinder 7, or between the cylinder 7 and the bell 10, may be determined at any moment by moving a pointer 48 along the scale 19.

The working of the apparatus according to the invention can be explained as follows:

When bad weather is to be expected there is generally a preceding rise of temperature. In consequence of said rise of temperature, the air in the cylinder 9 expands. Before the depression, thus before a normal barometer has reached its corresponding lower position, the apparatus according to the invention has already, hours before, reached the position in which the levels of the liquid indicate the arising depression and thereby forecasting the weather.

The level of the liquid in the slot 8 in combination with the level in the capillary space between the tube 1 and the cylinder 7 indicates in which direction the weather conditions are changing. In other words, when the weather conditions are favorable or stable, the air will show little change in pressure, temperature, dampness and density, and the level of the liquid in the capillary space will be higher than the level of the liquid in the wider space, which is not capillary and the difference between both levels will be a maximum. With a rising temperature, the liquid in the slot rises more quickly than in the capillary space. At a quick rise of temperature, which normally precedes an unfavorable change in the weather the air within the cylinder 9 will work on the liquid between the cylinder 9 and bell 10 and the displacement thereof in the wider space will be effected more easily because in that space there is less resistance. The liquid in this space and in the narrow space between the tube and the outer cylinder and between the outer cylinder and the bell is displaced. However, in the wider space the displacement (rising) is quicker than in the capillary spaces and the difference of the levels will decrease, thus indicating an unfavorable change of the weather. Observations over a long period of time have verified this. The difference in levels decreases owing to the fact that the liquid in the capillary space was higher. Readings of the liquid levels in the slot 8 and in the capillary spaces taken at intervals over a period of hours will show the rise of the liquid in the slot to be considerably more than the rise in the capillary space. In accordance herewith, there will be indicated whether a bad state of the weather is to be expected or that under circumstances it will become warmer, while the above-mentioned difference in levels will disappear in case a violent storm is approaching.

Before and during violent stormy weather, the conditions (quality-volume) of the air change so quickly and radically in comparison with other changes in the air and thus of the weather conditions that the levels in the wider and capillary spaces get a quick rise resulting in the disappearance of the difference or a very small difference. This has been observed many times many hours before.

In the same way, both levels are going downwards and the difference of levels is increasing in case of more favorable and stable weather approaching after storm. Also, this has been observed with the instrument many times and many hours before.

I claim:

1. A weather forecast apparatus comprising a glass tube closed at its lower end and open at its upper end and containing a non-volatile liquid, an air-filled inner cylinder sealed at its lower end and open at its upper end, a bell surrounding said cylinder for a part of its length and in communication with the upper end of the cylinder and a slotted cylinder having a longitudinally extending slot and positioned between the bell and tube, means for supporting the inner cylinder, the slotted cylinder and the bell in the open end of the glass tube, the dimensions of the glass tube, slotted cylinder and bell being such that capillary spaces are provided between the same, the bell and slotted cylinder extending partially in the liquid in the glass tube, the air-filled space of the inner cylinder and the communicating space of the bell being sealed from the atmosphere, and the spaces between the bell and the slotted cylinder and between the glass tube and slotted cylinder being exposed to the atmosphere.

2. An apparatus according to claim 1, and further comprising a ring in which the glass tube is mounted, said ring also supporting the slotted cylinder, a U-shaped member connected to and supporting said ring, a fixed support, and means including an adjusting screw for adjustably connecting the U-shaped member to the fixed support to provide for vertical adjustment of the glass tube and slotted cylinder.

3. A weather forecast apparatus comprising a glass tube closed at its lower end and open at its upper end and containing a non-volatile and non-congealable liquid, a cover for the open end of the glass tube, an air-filled inner cylinder sealed at its lower end and open at its upper end and a bell surrounding said cylinder for a part of its length and in communication with the upper end of the cylinder dependingly supported from the cover and extending into said glass tube, a slotted cylinder having a vertical slot positioned between the bell and tube and dependingly supported from the cover, the dimensions of the glass tube, slotted cylinder and bell being such that capillary spaces are provided between the same, the bell and slotted cylinder extending partially in the liquid in the glass tube, the air-filled space of the inner cylinder and the communicating space of the bell being sealed from the atmosphere, said cover having a passage placing the spaces between the bell and the slotted cylinder and slotted cylinder and the glass tube in communication with the atmosphere, a casing cylinder having longitudinally extending sight holes screwed onto the cover with one of the sight holes in alignment with the vertical slot in the slotted cylinder and a bottom base cap screw-threaded onto the casing cylinder whereby the glass tube may be pressed and tightened between the base cap and the cover.

4. An apparatus according to claim 3 and further comprising a screw depending in the inner cylinder and adapted to be screwed more or less into said inner cylinder in order to vary the air volume in said inner cylinder.

JOHANNES INGENHOF.

REFERENCES CITED

The following references are of record in the file of this patent:

UNITED STATES PATENTS

| Number | Name | Date |
| --- | --- | --- |
| 301,910 | McCleary | July 15, 1884 |
| 200,739 | Lowne | Feb. 26, 1878 |
| 784,986 | Chaney | Mar. 14, 1905 |
| 1,191,508 | Hartung | July 18, 1916 |
| 1,599,002 | Baukus | Sept. 7, 1926 |
| 2,003,439 | Hardy | June 4, 1935 |

FOREIGN PATENTS

| Number | Country | Date |
| --- | --- | --- |
| 1,616 | Great Britain | 1861 |
| 1,262 | Great Britain | 1867 |